US011962978B2

(12) United States Patent
Pihl et al.

(10) Patent No.: US 11,962,978 B2
(45) Date of Patent: *Apr. 16, 2024

(54) CALIBRATION OF A REMOTE-CONTROL UNIT FOR USE IN ACOUSTIC REMOTE CONTROL

(71) Applicant: Widex A/S, Lynge (DK)

(72) Inventors: Michael Johannes Pihl, Copenhagen (DK); Sven Creutz Thomsen, Birkerod (DK); Johan Andersen, Copenhagen (DK); Michael Ungstrup, Allerod (DK); Martin Soderlind, Bagsvard (DK); Nanna Elkjaer Moller, Copenhagen (DK)

(73) Assignee: Widex A/S, Lynge (DK)

( * ) Notice: Subject to any disclaimer, the term of this patent is extended or adjusted under 35 U.S.C. 154(b) by 185 days.

This patent is subject to a terminal disclaimer.

(21) Appl. No.: 16/968,047

(22) PCT Filed: Jan. 15, 2019

(86) PCT No.: PCT/EP2019/050908

§ 371 (c)(1),
(2) Date: Aug. 6, 2020

(87) PCT Pub. No.: WO2019/154596

PCT Pub. Date: Aug. 15, 2019

(65) Prior Publication Data

US 2021/0037326 A1 Feb. 4, 2021

Related U.S. Application Data

(60) Provisional application No. 62/628,412, filed on Feb. 9, 2018.

(51) Int. Cl.
*H04R 25/00* (2006.01)

(52) U.S. Cl.
CPC .......... *H04R 25/558* (2013.01); *H04R 25/30* (2013.01); *H04R 25/554* (2013.01)

(58) Field of Classification Search
CPC .... H04R 25/30; H04R 25/554; H04R 25/558; H04R 29/001

(Continued)

(56) References Cited

U.S. PATENT DOCUMENTS 5,083,312 A 1/1992 Newton et al.
6,842,647 B1 1/2005 Griffith et al.

(Continued)

OTHER PUBLICATIONS

Fabian Höflinger, et al., "Smartphone remote control for home automation applications based on acoustic wake-up receivers", 2014 IEEE International Instrumentation And Measurement Technology Conference (I2mtc) Proceedings, May 12, 2014, pp. 1580-1583.

(Continued)

*Primary Examiner* — Phylesha Dabney
(74) *Attorney, Agent, or Firm* — Sughrue Mion, PLLC

(57) ABSTRACT

A remote-control unit (10) is adapted for sending a control signal with instructions as an acoustic signal for controlling a hearing assistive device (20). A calibration method comprises outputting tone frequencies applied by the control signal, receiving the output tone frequencies and compare tone frequency levels relatively to a reference, adjusting relative volumes of the tone frequencies applied by the control signal in dependence of the comparison, and storing the adjusted relative volumes of the tone frequencies for use when sending a control signal with instructions as acoustic signals.

25 Claims, 4 Drawing Sheets

(58) Field of Classification Search
USPC .......................................................... 381/315
See application file for complete search history.

(56) References Cited

U.S. PATENT DOCUMENTS

| | | | | |
|---|---|---|---|---|
| 2006/0262942 | A1 | 11/2006 | Oxford | |
| 2007/0009126 | A1 * | 1/2007 | Fischer ................ | H04R 25/558 381/315 |
| 2010/0142738 | A1 | 6/2010 | Zhang et al. | |
| 2014/0140522 | A1 | 5/2014 | Deng | |

OTHER PUBLICATIONS

International Search Report for PCT/EP2019/050908 dated Mar. 1, 2019 [PCT/ISA/210].
Written Opinion for PCT/EP2019/050908 dated Mar. 1, 2019 [PCT/ISA/237].

* cited by examiner

CALIBRATION OF A REMOTE-CONTROL UNIT FOR USE IN ACOUSTIC REMOTE CONTROL

CROSS REFERENCE TO RELATED APPLICATIONS

This application is a National Stage of International Application No. PCT/EP2019/050908 filed Jan. 15, 2019, claiming priority based on U.S. patent application Ser. No. 62/628,412 filed Feb. 9, 2018.

The present invention relates to a communication channel between a remote control and a hearing assistive device, and more particularly, an audio based communication channel. The invention furthermore relates to a method of calibrating a remote-control unit, and a computer-readable storage medium having computer-executable instructions, which, when executed by a processor of a remote-control unit, provides an app having a user interface being adapted for user interaction.

When using a commercial available smartphone as remote control for a hearing assistive device, e.g. a hearing aid, application software (app) is loaded into the smartphone and a signaling protocol contained in the application software is applied. For various types of Frequency-Shift Keying (FSK), the signals are represented by tone bursts at discrete frequencies in the high frequency part of the audible acoustic range. In case the speaker of the smartphone outputting symbols as tone bursts is not perfectly flat (decays at high frequencies or comprises a minimum), some of the symbols may be played at a lower sound level than other symbols. This may affect the quality of the symbol detection in the hearing assistive device, and thereby cause signaling errors and annoy the user of the hearing assistive device.

The purpose of the invention is to provide a remote-control unit for controlling a hearing assistive device, where the remote-control unit outputs an acoustic signal containing symbols as tone bursts of substantially equal sound level.

According to the invention, this purpose is achieved by a method described herein. Hereby the processor of the remote-control unit may calibrate or adjust the volume of the individual tone bursts (symbols) and thereby compensate for a speaker lacking flatness (flat response) in the frequency band used by the acoustic signal.

According to a second aspect of the invention there is provided a remote-control unit described herein. The remote-control unit, say a smartphone, is calibrated via self-assessment as the tone bursts (symbols) is output via the speaker and detected via the microphone. According to this aspect, there is only required a one-way communication protocol between remote-control unit and the hearing assistive device. Furthermore, a method for calibrating a remote-control unit and a software product is provided according to the second aspect of the invention.

According to a third aspect of the invention there is provided a hearing assistive system described herein. The hearing assistive system is calibrated by outputting the tone bursts (symbols) via the speaker of the remote-control unit, and the sound signal is picked up and evaluated by the hearing assistive device. This aspect of the invention requires a two-way communication, but the calibration process is more precise as the transducers used for calibration are the transducers to be used for the acoustic remote-control. Furthermore, a method for calibrating a remote-control unit and a software product is provided according to the third aspect of the invention.

The invention will be described in further detail with reference to preferred aspects and the accompanying drawing, in which.

Figure 6:
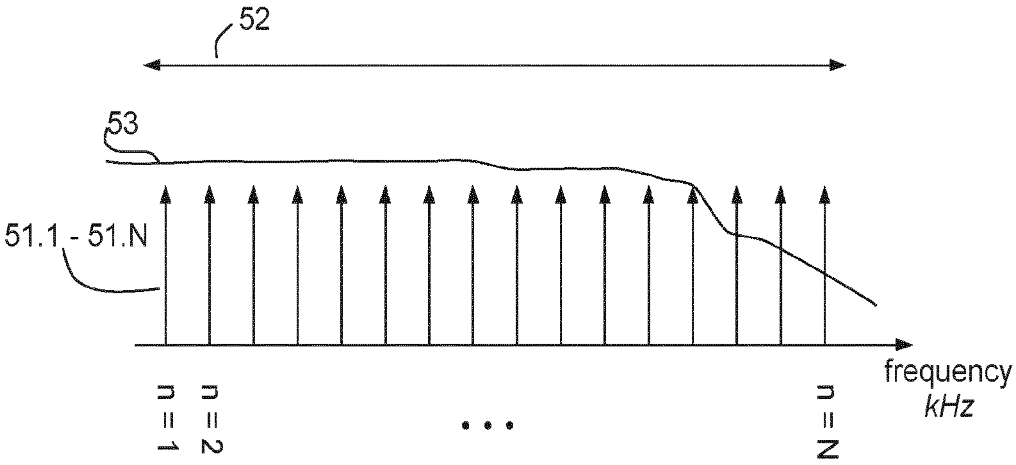
Figure 4:
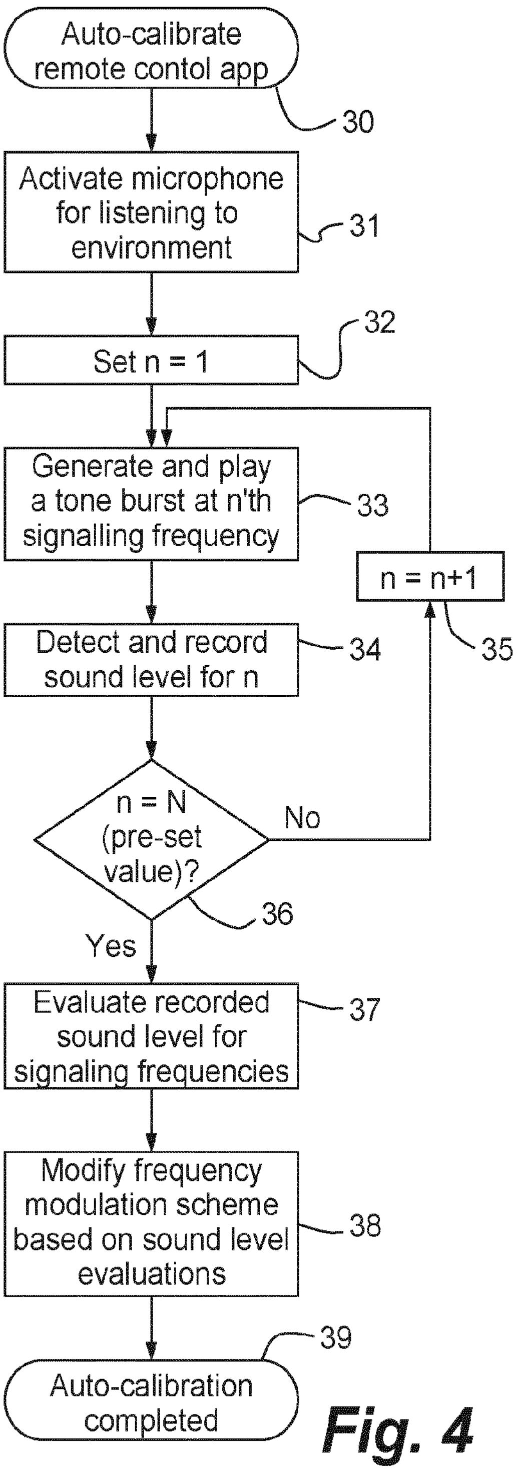
Figure 5:
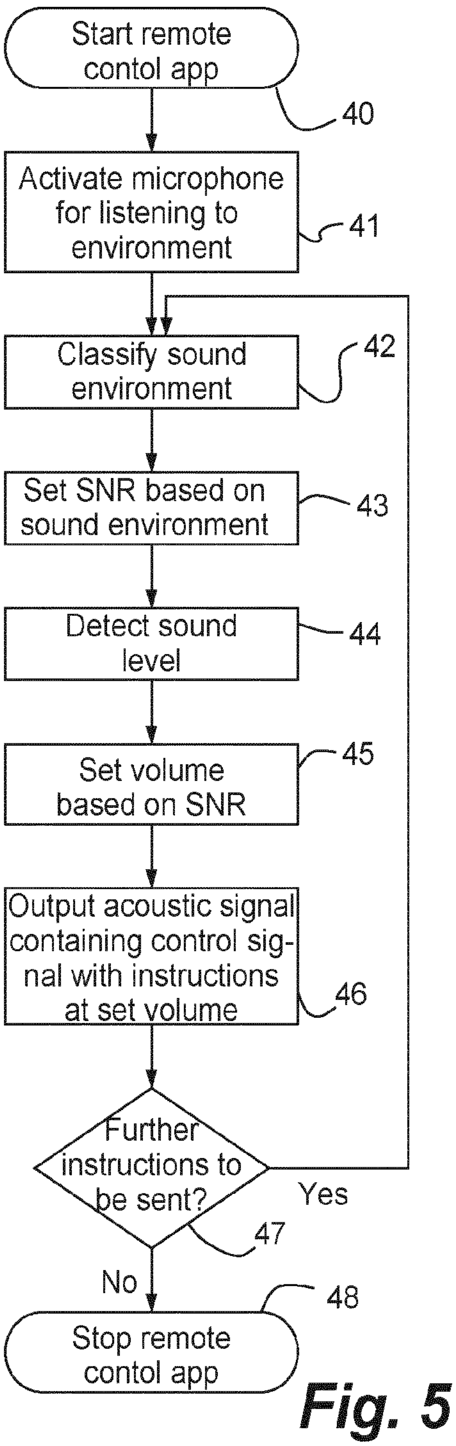
Figure 7:
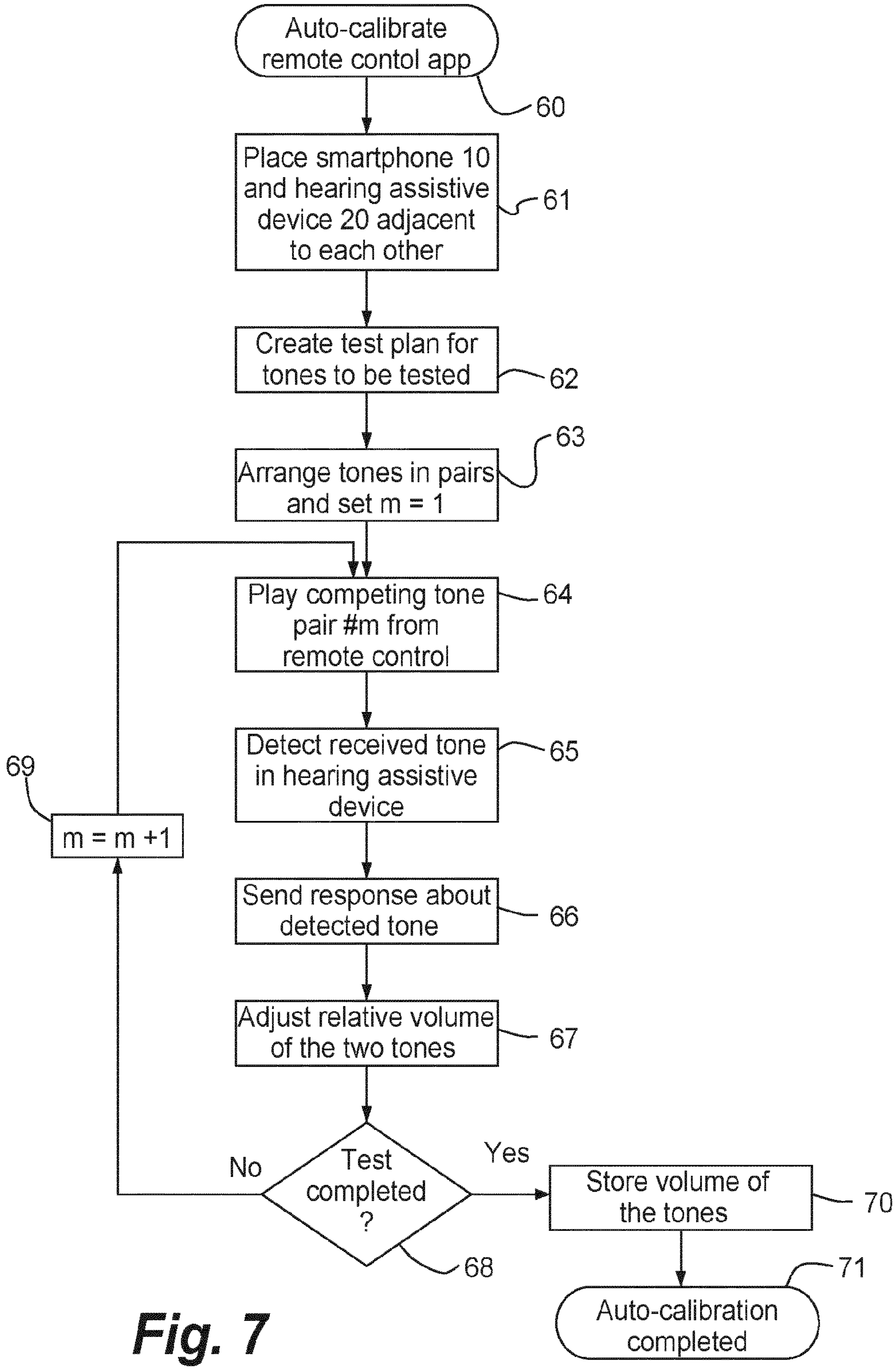

FIG. 4 illustrates as flow chart for one implementation of an auto-calibration method according to the invention, FIG. 5 illustrates as flow chart for one implementation for a volume setting of the audio signaling method according to the invention, FIG. 6 illustrates the distribution of the tone signal in the acoustic signaling during the auto-calibration, and FIG. 7 illustrates as flow chart for a second embodiment of an auto-calibration method according to the invention.

DETAILED DESCRIPTION

In one embodiment, the remote-control unit according to the invention is provided by a smartphone. A smartphone is a handheld personal computer with a mobile operating system and an integrated mobile broadband cellular network connection for voice and Internet data communication. Smartphones can run a variety of software components, known as “apps”. Most basic apps are pre-installed with the system, while others are available for download from web places like app stores.

The current invention relates to a remote-control, e.g. a smartphone 10, controlling one or two hearing assistive devices 20 (Left and Right). In the illustrated embodiment, the hearing assistive devices 20 being adapted to at least partly fit into the ear of the wearer and amplify sound, either sound from the environment or streamed sound. Hearing assistive devices include Personal Sound Amplification Products (PSAP) and hearing aids. Both PSAP’s and hearing aids are small electroacoustic devices which are designed to process, amplify or limit sound for the wearer. PSAP’s are mostly off-the-shelf amplifiers for people with normal hearing or slightly reduced hearing who need a little adjustment in volume (such as during hunting, concerts or bird watching).

Figure 1:
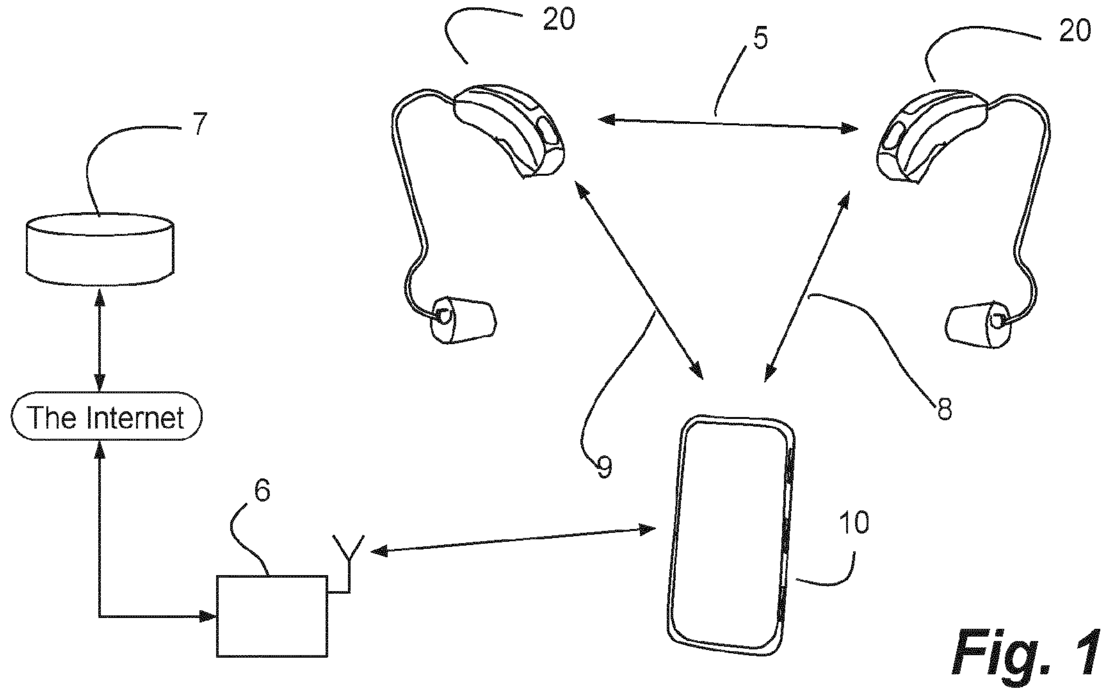
FIG. 1 illustrates the communication paths between a smartphone and two hearing assistive devices according to one embodiment of the invention.

FIG. 1 illustrates the communication paths between the smartphone 10 and the two hearing assistive devices 20. The two hearing assistive devices 20 each includes, according to one embodiment of the invention, a magnetic induction radio being responsible for the inter-ear communication 5 between two hearing assistive devices 20.

An acoustic communication link 8 and 9 between the smartphone 10 and the respective one of the two hearing assistive devices 20 is according to the invention provided by an audio modulator application software (App) stored in the smartphone 10 and an audio transceiver implemented in a signal processor of respective hearing assistive devices 20. In one embodiment, there may be provided a short-range radio link (not shown), e.g. Bluetooth®, between the smartphone 10 and the two hearing assistive devices 20. According to the invention, the smartphone 10 may act as remote-control while the two hearing assistive devices 20 are in a flight mode or a power saving mode. This is very important when changing mode or settings with the Bluetooth® radio disabled.

Some types of hearing assistive devices 20 may, due to size constraints, have been manufactured without a Bluetooth® radio, and therefore a remote-control need to incorporate a magnetic induction radio compatible to the one used for the inter-ear communication 5. According to the invention, there is no need a dedicated remote-control, as the remote-control functionality may be provided by means of smartphones available on the market and appropriate software providing the required acoustic signaling functionality.

In an embodiment where the sole communication link between the smartphone 10 and the two hearing assistive devices 20 is provided by the acoustic communication link 8 and 9, the inter-ear communication link 5 based upon an inductive link may improve robustness as the two hearing assistive devices 20 may detect the same acoustically transmitted data, and the transmitted data may be verified and or corrected via the inter-ear communication link 5. This may reduce the head shadow effect.

Figure 2:
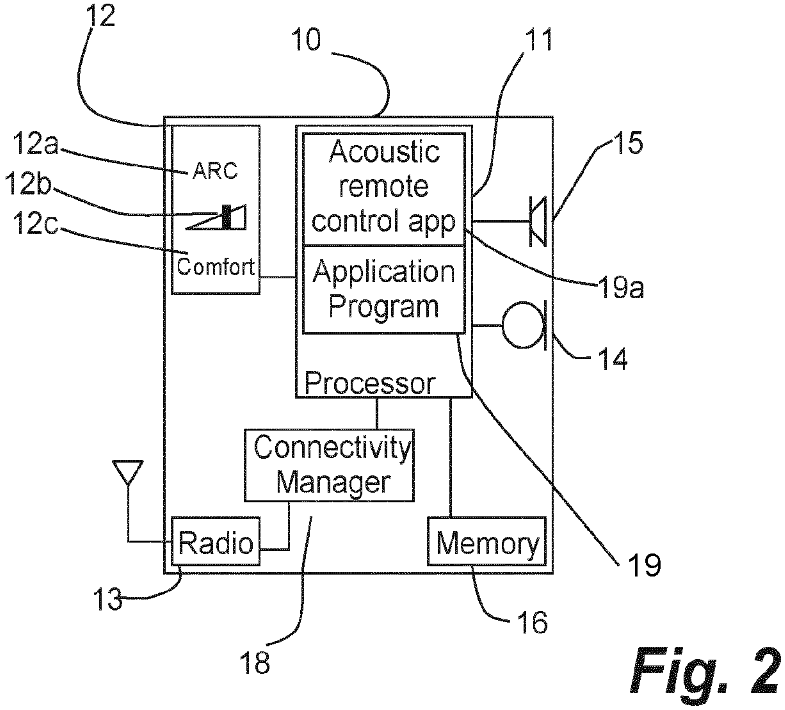
FIG. 2 illustrates an embodiment of a smartphone having a processor for running an application program according to the invention.

FIG. 2 illustrates the basic elements of a smartphone 10. The smartphone 10 includes a general-purpose processor 11, which is a central processing unit (CPU) that carries out the instructions of a computer program by performing the basic arithmetic, logical, control and input/output (I/O) operations specified by the instructions. The general-purpose processor 11 is associated with memory 16 forming a computer-readable storage medium having computer-executable instructions.

The smartphone 10 includes a microphone 14 for picking up audio, e.g. speech, and generating an electronic representation for the audio signal to be fed to the general-purpose processor 11. The smartphone 10 is a multi-radio device having radio interfaces towards cellular networks as GSM, WCDMA and LTE, short range networks as WLAN and Bluetooth™, and for positioning systems as GPS. A connectivity manager 18 is managing telephone calls, data transmission and data receiving via a multi-mode radio 13. The smartphone 10 has a user interface 12, such a touch-screen, enabling the user to interact directly with what is displayed.

FIG. 2 illustrates that user interface 12 displays a screen shot for an acoustic remote-control app 19*a* including an audio modulator and an audio demodulator for sending and receiving control signals, respectively. The screen shot for the acoustic remote-control app 19*a* includes a header 12*a* informing the user about that the current active app is the Acoustic Remote Control, "ARC". A volume control area 12*b* indicates the current volume by means of a movable column informing the user about the current volume level relative to the volume range permitted for user adjustment and marked by a triangle permitting the user to slide the movable bar between min and max of the permitted volume range. A hearing aid program control area 12*c* permits the user to shift a hearing aid program. The user can select the appropriate program by swiping and tapping the hearing aid program control area 12*c*.

The smartphone 10 includes a speaker 15 for output delivered from the general-purpose processor 11. The memory 16 is illustrated as one unit, but a man skilled in the art is aware that a computer memory comprises a volatile memory part acting as working memory (Random-Access Memory) and requiring power to maintain the stored information, and a non-volatile memory part (e.g. Read-Only Memory, flash memory) in which stored information is persistent after the smartphone 10 has been powered off.

The memory 16 may contain computer-executable instructions for a plurality of application programs 19 (apps) including an acoustic remote-control app 19*a*. The application programs 19 may be downloaded from an app store on a remote server or pre-stored in the smartphone 10 when delivered from the factory. The general-purpose processor 11 runs the computer-executable instructions for the acoustic remote-control app 19*a* and provides an application program having a user interface 12 being adapted for user interaction. The acoustic remote-control app 19*a* includes computer-executable instructions for generating a control signal with instructions, often in response to a user interaction, and for outputting the control signal with instructions on an audio carrier via the output transducer 15 targeted for the hearing assistive device 20.

The remote control is according to one embodiment an Internet enabled smartphone 10. The smartphone 10 is via an access point 6 connected to the Internet. The connection may be a wireless connection (e.g. WLAN such as 802.11x), or a cellular connection (e.g. WCDMA or LTE). The smartphone 10 may access a remote server 7 containing hearing aid user accounts.

Figure 3:
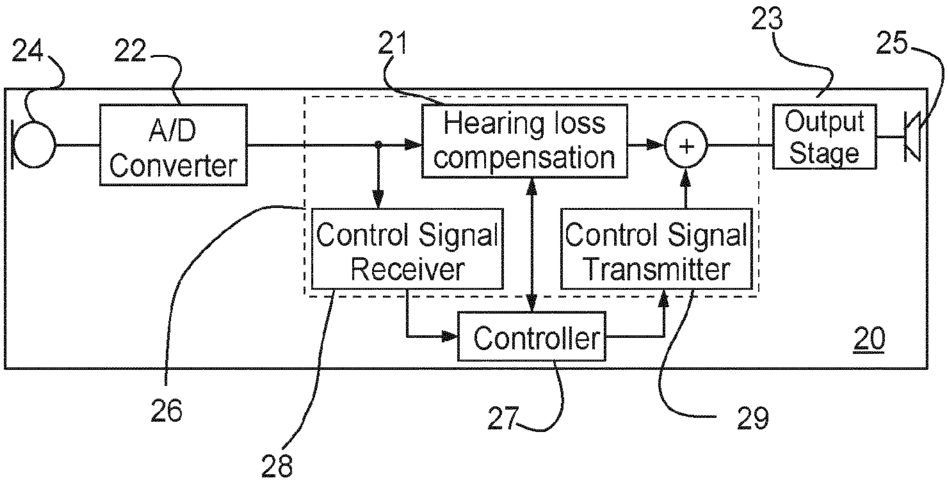
FIG. 3 illustrates an embodiment of a hearing assistive device according to the invention having an audio signaling block.

FIG. 3 illustrates an embodiment of a hearing assistive device 20 according to the invention comprising a control signal receiver 28 and a control signal transmitter 29. A microphone 24 picks up an acoustic signal, and an analog-to-digital converter 22 converts the signal picked up into a digital representation. The digital input signal is fed to a processing unit 26 comprising a digital signal processing path 21 for alleviating a hearing loss by amplifying sound at frequencies in those parts of the audible frequency range where the user suffers a hearing deficit. From the digital signal processing path 21, a signal is branched to the control signal receiver 28.

In one embodiment, the control signal with instructions is frequency modulated by means of Frequency-Shift Keying (FSK). Frequency-Shift Keying is a frequency modulation scheme in which digital information is transmitted through discrete frequency changes of a carrier signal. The simplest Frequency-Shift Keying concept is Binary Frequency-Shift Keying (BFSK). Binary Frequency-Shift Keying uses a pair of discrete frequencies to transmit binary (0 and 1) information. In one embodiment, the control signal with instructions contained in a frequency band above 10 kHz, preferably above 15 kHz.

At the input of the control signal receiver 28, a band-pass filter removes noise present outside the frequency band of the control signal. By means of a mixer, the FSK signal is down converted to base band. Preferably, the mixer creates an in-phase (I) component as well as a quadrature (Q) component being shifted 90° in phase.

The quadrature signal is demodulated by using a conventional matched filter approach for detecting the frequency the incoming signal, and the data content is detected, and error corrected. Hereafter data content is supplied to a controller 27 translating the data received from the control signal receiver 28 into commands to perform predetermined actions or into instructions to store transmitted data in specified memory locations of the hearing assistive device 20.

When the controller 27 identifies a need for sending a message to the smartphone 10, a control signal transmitter 29 is instructed to prepare data for transmission. The data is modulated according to the used audio FSK modulation scheme. The audio FSK modulated data is added to data in the digital signal processing path 21 in a summation point, and thereafter converted to sound by means of the output stage 23 and the speaker 25.

Multiple Frequency Shift Keying (MFSK) are related FSK modulation schemes based on multi-frequency shift keying digital transmission modes in which discrete audio tone bursts of various frequencies convey digital data. Binary-FSK is a first transmission mode using two frequencies. Another transmission mode uses tones of 16 frequencies and may be called MFSK16. Further transmission modes are available. The tones are transmitted successively, and each tone lasts for a fraction of a second.

Once the user has loaded the acoustic remote-control app 19*a* to the smartphone 10, the acoustic remote-control app 19*a* starts testing the hardware of the smartphone 10. The acoustic remote-control app 19*a* will notify the user about the testing via the user interface 12, and the user is prompted to place the smartphone 10 in a silent environment with limited background noise and in physically soft environment without reflecting surfaces in the vicinity. Hereafter the remote control or smartphone 10 initiates an auto-calibration method according to the invention. The purpose of the auto-calibration method described with reference to FIG. 4 is to ensure that the smartphone 10 has a substantial flat output characteristic in the signaling band used by the acoustic signal containing the control signal with instructions.

The acoustic remote-control app 19*a* will automatically start the auto-calibration process in step 30 as shown in FIG. 4 when opened for the first time. The auto-calibration could also be started from the settings of the app in case the acoustic remote-control app 19*a* has failed.

Auto-Calibration Using Smartphone as Transmitter and Receiver

Upon start of the auto-calibration process, the acoustic remote-control app 19*a* activates the microphone 14 for listening to the environment. At step 32, the processor 11 sets the parameter N to the value "1". In step 33, the acoustic remote-control app 19*a* generates and plays the N'th (starting with N=1) discrete audio tone burst via the speaker 15 of the smartphone 10. In step 34, the acoustic remote-control app 19*a* detects and record the sound level of the N'th (starting with N=1) discrete audio tone burst via the microphone 14 of the smartphone 10. In case MFSK16 is the preferred and default frequency modulation scheme, N is compared to a pre-set value (16 due to the default frequency modulation scheme) in step 36. By incrementing N with one in step 35, the acoustic remote-control app 19*a* will run through the play-and-record sub-routine for all sixteen frequencies predefined for the MFSK16 frequency modulation scheme or another pre-set value for another default frequency modulation scheme.

Once the acoustic remote-control app 19*a* in step 36 finds that N has reached the pre-set value (all signaling frequencies have been tested), the acoustic remote-control app 19*a* starts in step 37 the evaluation of the recorded sound levels for the signaling frequencies. Furthermore, the acoustic remote-control app 19*a* deactivates the microphone 14 as the testing of the speaker 15 has been completed. The evaluation has the purpose of ensuring that the discrete audio tone bursts output by the speaker 15 have substantially the same sound level. If some of the discrete audio tone bursts output by the speaker 15 is detected to have sound levels falling outside a predetermined range of sound levels, the acoustic remote-control app 19*a* may have to modify the frequency modulation scheme based on the analyzed sound levels in step 38.

The modification of the frequency modulation scheme in step 38 may comprise adjusting the balance between frequency components present in the frequency modulation scheme. Hereby the processor 11 uses equalization of the frequency components present in the frequency modulation scheme to compensate for the lack of flatness of the output from the speaker 15 in the frequency band used by the control signal according to the applied frequency modulation scheme.

Another option would be to apply a frequency modulation scheme occupying a narrower frequency band. This is done by changing transmission mode. Finally, it would be possible to change carrier frequency and thereby use a lower or a higher frequency band. The cost may be that the control signals becomes audible more for more people.

The auto-calibration process will now be completed, and the acoustic remote-control app 19*a* may hereafter be used for remote-controlling an appropriate hearing assistive device 20 by means of the applied frequency modulation scheme. In one embodiment, the remote control or smartphone 10 sends a pre-defined sequence to the hearing assistive device 20 containing information about the applied frequency modulation scheme. The hearing assistive device 20 stores this information and starts to apply frequency modulation scheme for decoding the acoustic remote-control signals.

FIG. 6 shows an example for the auto-calibration process as disclosed above. The acoustic remote-control app 19*a* uses a frequency band 52 for the audio signaling. The auto-calibration process according to one embodiment of the invention uses a plurality of audio tone bursts 51.1-51.N at N discrete frequencies contained in the frequency band 52. During the auto-calibration, the N discrete frequencies are successively tested by outputting the audio tone bursts 51.1-51.N one by one. The signal level picked up by the microphone 14 of the smartphone 10 is a signal level curve 53. It is seen that the signal level curve 53 is not flat over the entire frequency band 52. The acoustic remote-control app 19*a* then must choose a narrower frequency band for an alternative frequency modulation scheme or selectively increase the gain for tones or frequencies reproduced at too low levels.

In one embodiment of the invention, the step 33 (FIG. 4) includes generating and playing of the discrete tone at a specific frequency, includes successively generating and playing of the discrete tone at a plurality of multimedia volume settings, e.g. at three different volume setting. The multimedia volume setting is normally used by the user to control the output sound of the speaker 15 in a multimedia application. By allowing the acoustic remote-control app 19*a* to test the signal sound level for the discrete tone at a plurality of multimedia volume settings, the acoustic remote-control app 19*a* will afterward be able to use interpolation to identify a multimedia volume setting providing the desired signal sound level.

According to one embodiment of the auto-calibration process according to the invention, the flatness of the speaker 15 is tested by outputting a white noise signal containing the entire frequency band 52. The audio signal picked up by the microphone 14 of the smartphone 10 is used to generate a signal level curve including the frequencies for the audio tone bursts used for the audio signaling. In case the signal level curve is not flat over the entire frequency band 52, the acoustic remote-control app 19*a* then must choose to selectively increase (or adjust) the gain for tones or frequencies reproduced at too low (or too high) levels, or to choose a narrower or shifted frequency band for an alternative frequency modulation scheme.

FIG. 5 illustrates as flow chart for one embodiment for the volume setting of the audio signaling method according to the invention. When the user, in step 40, activates the acoustic remote-control app 19*a* on the smartphone 10, the acoustic remote-control app 19*a* activates, in step 41, the microphone 14 and starts listening to the environment of the smartphone 10. During step 42, the smartphone 10 classifies the environment as some environments may have many spikes and fluctuations in noise level at the frequencies audio signaling, whereby the audio transmission from the acoustic remote-control app 19*a* may be challenged. In challenging environments, it is beneficial to increase the Signal-to-Noise Ratio to keep the Bit Error Rate (BER) low. The Bit Error Rate (BER) is the number of bit errors per unit time. Signal-to-noise ratio (SNR) is a measure that compares the level of a desired signal to the level of background noise. Signal-to-noise ratio (SNR) is defined as the ratio of signal power (meaningful information) and the power of background noise (unwanted signal): $SNR=P_{signal}/P_{noise}$. The acoustic remote-control app 19*a* includes a look-up table from where it in step 43 reads a predetermined Signal-to-Noise Ratio associated with the classified sound environment.

In one embodiment, the control signal has a signaling rate up to 100 single symbols per second.

In one embodiment, the Signal-to-Noise Ratio (SNR) is set to a fixed value from manufacturing.

If the background noise is fluctuating (having many of spikes and varying Sound Pressure Level (SPL) at the frequency band 52 used by the control signal) the robustness or the Bit Error Rate (BER) for the control signal will be improved by increasing the volume for the control signal and thereby the Sound Pressure Level (SPL) for the output acoustic signal.

The sound level or the Sound Pressure Level (SPL) of the sound output by the speaker 15 of the smartphone is controlled by adjusting the volume of the smartphone.

In step 44, the smartphone 10 detects the sound level ($P_{noise}$) of the background noise, and in step 45 the smartphone 10 sets the signal level ($P_{signal}$) for the discrete audio tone bursts generated by the acoustic remote-control app 19*a* based on the applied Signal-to-Noise Ratio (SNR).

Hereafter, the smartphone 10, in step 46, outputs an acoustic signal containing the acoustic remote-control signal with instructions for the hearing assistive device 20 at the volume set at step 45. In step 47, the acoustic remote-control app 19*a* evaluates whether further instructions need to be sent. If so, the acoustic remote-control app 19*a* goes to step 42 for reclassification of the environment and detection of the changed sound level prior to sending the further instructions.

If no further instruction is to be sent in step 47, the acoustic remote-control app 19*a* deactivates the microphone 24 as the sending of the acoustic remote-control signal with instructions has been completed. The acoustic remote-control app 19*a* is terminated in step 48. The classification of the environmental sound (step 42) and the detection the sound level (step 44) may take place as concurrent activities.

In one embodiment, the sound environments classification of step 42, the detection of the environmental sound level of step 44, the volume adjustment of step 45, and the outputting of control signals in step 46 are concurrent processes. This means that the smartphone 10 is outputting a train of single symbols and simultaneously monitors the background noise. If the background noise changes, the processor 11 adjusts the volume of the speaker 15 during the ongoing outputting of the single symbols. The volume is preferably adjusted in between the single symbols.

By using a frequency band 52 for the audio signaling above the normal speech spectrum, e.g. above 10 kHz, it is possible to isolate the control signal from a speech signal by means of high-pass filtering in the hearing assistive device. By using a carrier signal above the normal speech spectrum, e.g. at 15 kHz or above, it is possible to use a smartphone for the signaling without the control signal becomes too annoying for persons close to the hearing aid user.

In one embodiment, the processor 11 of the smartphone sets the volume for the control signal with instructions in accordance to a predetermined Signal-to-Noise Ratio (SNR), e.g. 20 dB. Hereby the app software run by the smartphone processor 11 ensures that the volume for the control signal across various smartphone platforms is sufficiently high relatively to the current background noise picked up by the hearing aid. In one embodiment, the Signal-to-Noise Ratio (SNR) is set higher, e.g. 30 dB, due to the noise environment classification.

In one embodiment, the smartphone 10 is paired with the hearing assistive device 20 prior to the auto-calibration discussed with reference to FIG. 4. The pairing has the advantage that the acoustic remote-control app 19*a* running on the smartphone 10 may gain knowledge about the hearing assistive device 20 and use this knowledge when modifying the frequency modulation scheme in step 38.

The smartphone 10 may access the remote server 7 containing hearing aid user accounts. By means of an ID for the hearing assistive device 20 or identification of the hearing aid user, the smartphone 10 may retrieve information about the hearing assistive device 20 from the remote server 7. This information may include which transmission modes the hearing assistive device 20 supports, and whether the hearing assistive device 20 serves two or more carrier frequencies.

The pairing of the smartphone 10 and the hearing assistive device 20 may be provided by using the acoustic remote-control app 19*a* for scanning a QR code e.g. on a packaging label (sales package) of hearing assistive device 20 to read the hearing aid ID. Then the smartphone 10 may retrieve information about the hearing assistive device 20 from the remote server 7.

In another embodiment the user of the hearing assistive device 20 may enter the hearing aid ID or identify himself via the acoustic remote-control app 19*a*, whereby smartphone 10 may retrieve the information about the hearing assistive device 20 from the remote server 7.

Auto-Calibration Using Hearing Assistive Device as Audio Receiver

FIG. 7 illustrates as flow chart for a second embodiment of an auto-calibration method according to the invention. A two-way auto-calibration method for the speaker volume is described, and the method also includes equalization of the used frequencies. The acoustic remote-control app 19*a* will automatically start a two-way auto-calibration process in step 60 when opened for the first time. The user is requested in step 61 to place the smartphone 10 and the hearing assistive device 20 in an environment with limited background noise and without reflecting surfaces in the vicinity. The acoustic remote-control app 19*a* will bring the hearing assistive device 20 into a two-way auto-calibration mode by means of a control signal instruction output by the speaker 15.

In step 62, the acoustic remote-control app 19*a* creates a test plan of tones applied by the frequency modulation scheme, the tones are arranged as tone pairs by the acoustic remote-control app 19*a* in step 63, and a counter, m, identifying the position of the tone pair in the test plan. The smartphone 10 outputs the tone pair, which is received and evaluated by the control signal receiver 28 of the hearing assistive device 20 in step 65. The simplest evaluation is the detection of the loudest tone. The hearing assistive device 20 uses the control signal transmitter 29 for communicating the outcome of the evaluation back to the smartphone 10 in step 66.

The acoustic remote-control app 19*a* receives the evaluation for the m'th tone pair and adjusts the relative volume of the two tones in the m'th tone pair in step 67. Based upon the latest evaluation from the hearing assistive device 20 and the progress in of the test plan, the acoustic remote-control app 19*a* decides whether the auto-calibration has been completed in step 68. In case the auto-calibration has not been completed yet, the counter, m, is incremented in step 69 and steps 64 to 67 is repeated for the next tone pair.

Once the acoustic remote-control app 19*a* decides that the auto-calibration has been completed in step 68, the acoustic remote-control app 19*a* stores the achieved settings for the volume of the individual tones in step 70, and the auto-calibration procedure is deemed to be completed in step 71. One success criteria may be that all tones are played at an equal sound level. The settings for the volume of the individual tones may now be used in the acoustic remote-control app 19*a* for remote controlling the hearing assistive device 20 as explained with reference to FIG. 5.

Hereby, the acoustic remote-control decoder (the control signal receiver 28 and the controller 27) of the hearing assistive device 20 may be regarded as the final judge determining what it "hears" and what it detects. By playing the two competing symbols at different relative levels, the point where the two symbols may be detected equally well by the hearing assistive device 20. This procedure is repeated for the different combinations of competing symbols. A sending volume for all symbols where these are seen equally loud may hereby be achieved.

To avoid playing some symbols unnecessarily loud, the smartphone 10 listens to the background noise and adjusts the sending volume to make it be as small as possible while still being louder than the background noise. The above discussed two-way auto equalization is assumed to take place with the hearing assistive device 20 lying on the smartphone 10 or adjacent to it. The equalization compensates for the frequency response of the entire signal path from acoustic remote-control app 19*a* to the acoustic remote-control decoder (the control signal receiver 28 and the controller 27) of the hearing assistive device 20, inclusive the transmission environment. This will be a good starting point though the signal path from the smartphone 10 to the hearing assistive device 20 will be different when the HA is sitting on the user's ear.

In-Situ Fine-Tuning

When the auto-calibration process as described with reference to FIG. 4 or FIG. 7 has been completed, the signaling quality may be further improved in an in-situ fine-tuning session. The hearing assistive device 20 are placed in the user's ear, and the acoustic remote-control app 19*a* in the smartphone 10 sends a command to the hearing assistive device 20 about initiating a fine-tuning session. With the hearing assistive device 20 mounted in ear, the acoustic remote-control app 19*a* in the smartphone 10 sends competing symbols at varying relative volume, two symbols at a time, just like during the first equalization or calibration. Since the equalizing is almost in place, the fine-tuning process only needs to vary the relative volume a little, and only a few packets (consisting of a plurality of tones) need to be sent. The hearing assistive device 20 has a memory in which it records or logs what it hears.

When the transmission of the few packets has been completed, the user is requested to remove the hearing assistive device 20, place the smartphone 10 on a plane surface with the screen facing upwards and place the hearing assistive device 20 on top of or adjacent to the smartphone 10. Then a two-way acoustic signaling session is initialized by operating the user interface of the acoustic remote-control app 19*a*, asking the hearing assistive device 20 to output what is stored in the memory log during the in-situ part of the session. Based upon the log data received the acoustic remote-control app 19*a* calculates a fine-tuning based on what the hearing assistive device 20 received during the in-situ part of the session.

The invention claimed is:

1. A method for calibrating a remote-control unit adapted for sending a control signal with instructions as an acoustic signal for controlling a hearing assistive device, wherein the method comprises:

outputting from the remote-control unit tone frequencies applied by the control signal, receiving the output tone frequencies and comparing tone frequency levels relatively to a reference, adjusting relative volumes of the tone frequencies applied by the control signal in dependence of the comparison, storing the adjusted relative volumes of the tone frequencies for use when sending control signal with instructions as acoustic signals, and automatically triggering a calibration when loading an acoustic remote-control app into a smartphone, and opening the acoustic remote-control app for providing remote-control functionality.

2. The method according to claim 1, wherein the method comprises:

activating a microphone for listening to the environment, successively outputting tone frequencies as a train of tones, and comparing the tone frequency levels of an individual tone in the train of tones to previous tones in the train of tones.

3. The method according to claim 1, wherein the method comprises:

activating a microphone for listening to the environment, outputting tone frequencies as white noise in a frequency band applied by the acoustic signal, and comparing the tone frequency levels for tone frequencies applied by the acoustic signal.

4. The method according to claim 1, wherein the step of storing the adjusted relative volumes of the tones comprises discarding some of the tones used when sending a control signal with instructions according to a first frequency modulation scheme and applying a second frequency modulation scheme, wherein second frequency modulation scheme applies a subset of the tones applied in the first frequency modulation scheme.

5. A remote-control unit for controlling a hearing assistive device by sending a control signal with instructions as an acoustic signal, the remote-control unit having a processor, an input transducer an output transducer, and a memory, wherein the processor is adapted for controlling a calibration process by:

outputting tones via the output transducer, receiving tones via the input transducer, comparing tone level of the received tone relatively to a reference, adjusting relative volumes of the tones applied by the control signal in dependence of the comparison, and storing in the memory the adjusted relative volumes of the tones for use when sending a control signal with instructions as acoustic signals.

6. The remote-control unit according to claim 5, wherein the processor is adapted for automatically activating the input transducer when initializing the calibration.

7. The remote-control unit according to claim 5, wherein loading an acoustic remote-control app into a smartphone, and opening the acoustic remote-control app for providing remote-control functionality automatically triggers the calibration.

8. The remote-control unit according to claim 5, wherein the processor is adapted for:

activating a microphone for listening to the environment, successively outputting tones as a train of tones via the output transducer, and comparing the tone level of an individual tone in the train of tones to previous tones in the train of tones as reference.

9. The remote-control unit according to claim 8, wherein the processor is adapted for storing the adjusted relative volumes of the tones comprises discarding some of the tones used when sending a control signal with instructions according to a first frequency modulation scheme and applying a second frequency modulation scheme, and wherein second frequency modulation scheme applies:

a subset of the tones applied in the first frequency modulation scheme, or a set of the tones applied in a frequency band different from the frequency band applied by the first frequency modulation scheme.

10. A method for calibrating a remote-control unit, the remote-control unit is adapted for sending a control signal with instructions as an acoustic signal for controlling a hearing assistive device, wherein the method comprises:

outputting tones via an output transducer of the remote-control unit, receiving tones via an input transducer, comparing tone level of the received tone relatively to a reference, adjusting relative volumes of the tones applied by the control signal in dependence of the comparison, and storing the adjusted relative volumes of the tones for use when sending a control signal with instructions as acoustic signals, and automatically activating the input transducer when initializing a calibration.

11. The method according to claim 10 and comprising automatically initiating the calibration wherein loading an acoustic remote-control app into a smartphone and opening the acoustic remote-control app for providing remote-control functionality.

12. The method according to claim 10 wherein the method further comprises step of:

activating the microphone for listening to the environment, successively outputting tones as a train of tones via the output transducer, and comparing the tone level of an individual tone in the train of tones to previous tones in the train of tones as reference.

13. A computer-readable storage medium having computer-executable instructions, which, when executed by a processor of a remote-control unit, provides an app having a user interface being adapted for user interaction, wherein the app is adapted for calibrating a remote-control unit, by:

outputting tones via an output transducer, receiving tones via an input transducer, comparing tone level of the received tone relatively to a reference, adjusting relative volumes of the tones applied by the control signal in dependence of the comparison, and storing the adjusted relative volumes of the tones for use when sending a control signal with instructions as acoustic signals.

14. A hearing assistive system comprising a hearing assistive device and a remote-control unit for controlling the hearing assistive device by sending a control signal with instructions as an acoustic signal, the remote-control unit having a processor, an input transducer, an output transducer, and a memory, the processor is adapted for controlling a calibration process during which:

the remote-control unit is adapted for outputting tones applied by the control signal via the output transducer, the hearing assistive device is adapted for receiving the tones and evaluating tone level of the received tones, the processor is adapted for:

adjusting relative volumes of the tones applied by the control signal in dependence of the evaluation, and storing the adjusted relative volumes of the tones for use when sending a control signal with instructions as acoustic signals.

15. The hearing assistive system according to claim 14, wherein the remote-control unit is adapted for outputting at least two tones simultaneously.

16. The hearing assistive system according to claim 15, wherein hearing assistive device is adapted for detecting the strongest of the at least two tones played simultaneously.

17. The hearing assistive system according to claim 14, wherein the hearing assistive device responds to the reception of the tones output by the remote-control unit by sending the evaluation to the remote-control unit as control signal with instructions as acoustic signals.

18. The hearing assistive system according to claim 17, wherein the hearing assistive device is placed adjacent to the remote-control unit, and wherein the hearing assistive device is adapted to provide a reply to the remote-control unit by sending instructions as acoustic signals immediately after the evaluation of the received tones by providing.

19. The hearing assistive system according to claim 17, wherein the hearing assistive device is placed in the ear of the user while the remote-control unit is playing multiple tones in a test sequence, wherein the hearing assistive device is placed adjacent to the remote-control unit after the test sequence has been completed, and wherein the hearing assistive device accumulates the evaluations of the received tones by providing an accumulated reply to the remote-control unit by sending instructions as acoustic signals.

20. A method for calibrating a remote-control unit, the remote-control unit is adapted for sending a control signal with instructions as an acoustic signal for controlling a hearing assistive device, wherein the method comprises:

outputting, from the remote-control unit, tones applied by the control signal, receiving, in the hearing assistive device, the output tones and evaluate tone level relatively to a reference, adjusting relative volumes of the tones applied by the control signal in dependence of the evaluation, and storing the adjusted relative volumes of the tones for use when sending a control signal with instructions as acoustic signals, and wherein the outputting of tones comprises playing at least two tones simultaneously.

21. The method according to claim 20, wherein the evaluation of the tone level comprises detecting the strongest of the at least two tones played simultaneously.

22. The method according to claim 20, and wherein the hearing assistive device responds to the reception of the tones output by the remote-control unit by sending the evaluation to the remote-control unit as control signal with instructions as acoustic signals.

23. The method according to claim 22, wherein the hearing assistive device is placed adjacent to the remote-control unit, and wherein the hearing assistive device immediately after the evaluation of the received tones by providing a reply to the remote-control unit by sending instructions as acoustic signals.

24. The method according to claim 22, where in the hearing assistive device is placed in the ear of the user while the remote-control unit is playing multiple tone in a test sequence, wherein the hearing assistive device is placed adjacent to the remote-control unit after the test sequence has been completed, and wherein the hearing assistive device accumulates the evaluations of the received tones by providing an accumulated reply to the remote-control unit by sending instructions as acoustic signals.

25. A computer-readable storage medium having computer-executable instructions, which, when executed by a processor of a remote-control unit, provides an app having a user interface being adapted for user interaction, wherein the app is adapted for calibrating the remote-control unit, by:

outputting, from the remote-control unit, tones applied by the control signal, receiving, from the hearing assistive device as acoustic signals, an evaluation of tone level detected relatively to a reference, adjusting relative volumes of the tones applied by the control signal in dependence of the evaluation, and storing the adjusted relative volumes of the tones for use when sending a control signal with instructions as acoustic signals.

* * * * *